United States Patent
Wu et al.

(10) Patent No.: US 12,391,406 B2
(45) Date of Patent: Aug. 19, 2025

(54) CAM TYPE AIRPLANE CABIN DOOR LOAD SIMULATION DEVICE AND SIMULATION METHOD

(71) Applicant: BEIJING INSTITUTE OF PRECISION MECHATRONICS AND CONTROLS, Beijing (CN)

(72) Inventors: Hao Wu, Beijing (CN); Xiaolu Wang, Beijing (CN); Zhenjin Nie, Beijing (CN); Shuai Liu, Beijing (CN); Zhe Pan, Beijing (CN); Danyang Wang, Beijing (CN); Guangran Niu, Beijing (CN); Lin Li, Beijing (CN)

(73) Assignee: Beijing Institute of Precision Mechatronics and Controls, Beijing (CN)

( * ) Notice: Subject to any disclaimer, the term of this patent is extended or adjusted under 35 U.S.C. 154(b) by 0 days.

(21) Appl. No.: 18/037,844

(22) PCT Filed: Sep. 30, 2021

(86) PCT No.: PCT/CN2021/122010
§ 371 (c)(1),
(2) Date: May 19, 2023

(87) PCT Pub. No.: WO2023/035342
PCT Pub. Date: Mar. 16, 2023

(65) Prior Publication Data
US 2023/0406542 A1    Dec. 21, 2023

(30) Foreign Application Priority Data

Sep. 13, 2021  (CN) .......................... 202111070247.7

(51) Int. Cl.
*B64F 5/60*      (2017.01)
*B64C 1/14*      (2006.01)

(52) U.S. Cl.
CPC .............. *B64F 5/60* (2017.01); *B64C 1/1423* (2013.01)

(58) Field of Classification Search
CPC ....... B64F 5/60; B64C 1/1407; B64C 1/1415; B64C 1/1423
(Continued)

(56) References Cited

U.S. PATENT DOCUMENTS 5,881,973 A * 3/1999 Agajanian ................. B64F 5/60
                                                    244/129.5
2020/0003651 A1* 1/2020 Berkey ............... G01M 3/3272
(Continued)

FOREIGN PATENT DOCUMENTS

CN     101477174 A    7/2009
CN     102507056 A    6/2012
(Continued)

OTHER PUBLICATIONS

European Search Report for Application No. 21956518.1 dated Aug. 5, 2024 (5 pages).

*Primary Examiner* — Eric S. McCall
(74) *Attorney, Agent, or Firm* — Boyle Fredrickson, S.C.

(57) ABSTRACT

The present application discloses a cam type airplane cabin door load simulation device and simulation method. The device comprises n cam groups, an input shaft, 3n couplers, and a friction disc load device; the n cam groups and the friction disc load device are connected in series by means of the input shaft; 3n couplers are provided on the input shaft; each cam group comprises a gravity cam simulation device, an inertia cam simulation device, and a wind load cam simulation device; and in each cam group, the gravity cam simulation device, the inertia cam simulation device, and the wind load cam simulation device are sequentially connected in series by means of the input shaft, and the tail ends of the (Continued)

n cam groups are connected in series with the friction disc load device by means of a coupler.

13 Claims, 3 Drawing Sheets

(58) Field of Classification Search
USPC .......................................................... 73/802
See application file for complete search history.

(56) References Cited

U.S. PATENT DOCUMENTS

2021/0225191 A1* 7/2021 Ross ................... A62C 99/0081
2022/0204937 A1* 6/2022 Shi .......................... C12M 35/04

FOREIGN PATENT DOCUMENTS

| | | |
|---|---|---|
| CN | 103604601 A | 2/2014 |
| CN | 106323618 A | 1/2017 |
| CN | 106706306 A | 5/2017 |
| CN | 107271160 A | 10/2017 |
| CN | 110763486 A | 2/2020 |
| CN | 212872795 U | 4/2021 |
| GB | 2562485 A | 11/2018 |
| KR | 20010054483 A | 7/2001 |

* cited by examiner

CAM TYPE AIRPLANE CABIN DOOR LOAD SIMULATION DEVICE AND SIMULATION METHOD

CROSS-REFERENCE TO RELATED APPLICATIONS

This disclosure is a national phase application of PCT international patent application PCT/CN2021/122010, filed on Sep. 30, 2021 which claims the benefit of the priority to Chinese Patent Application No. 202111070247.7, titled "CAM TYPE AIRPLANE CABIN DOOR LOAD SIMULATION DEVICE AND SIMULATION METHOD", filed with the China National Intellectual Property Administration on Sep. 13, 2021, which are incorporated herein by reference in its entirety.

TECHNICAL FIELD

The present disclosure belongs to the field of mechanical transmission, and relates to a cam type airplane cabin door load simulation device and simulation method.

BACKGROUND OF THE INVENTION

In the process of developing an aircraft cabin door actuation system, it is necessary to design a load simulator that can accurately simulate the load characteristics of the aircraft cabin door, and can simultaneously simulate multiple loads, such as a gravity load, a friction load, a gust wind disturbance load and a cabin door sealing load. The loading test of the aircraft cabin door actuation system is conducted to ensure that the aircraft cabin door actuation system can meet the actual use needs of the aircraft. However, there is no relevant load simulation design to achieve the loading test of the aircraft cabin door actuation system, which cannot meet the simulation needs of the actual use of the aircraft cabin door.

SUMMARY OF THE INVENTION

The technical problem solved by the present disclosure is that: a cam-type load simulator for aircraft cabin door and a simulation method therefor are provided, which overcomes the disadvantages of the prior art, and realizes the simultaneous simulation to various loads, such as a gravity load, an inertia load, a friction load, and a gust disturbance load.

A technical solution according to the present disclosure is described as follows:

a cam-type load simulator for aircraft cabin door includes n cam sets, an input shaft, 3n couplings and a friction disk; the n cam sets and the friction disk are connected in series through the input shaft; the 3n couplings are arranged on the input shaft; each cam set includes a gravity cam simulator, an inertia cam simulator and a wind load cam simulator; in each cam set, the gravity cam simulator, the inertia cam simulator and the wind load cam simulator are sequentially connected in series through the input shaft, and one coupling is provided between the gravity cam simulator and the inertia cam simulator, one coupling is provided between the inertia cam simulator and the wind load cam simulator, the n cam sets share 2n couplings; one coupling is provided between any two adjacent cam sets, and (n−1) couplings are provided between the cam sets; and the friction disk is connected to the tail ends of the n cam sets connected in series through one coupling.

In the above cam-type load simulator for aircraft cabin door, the load simulator further include (3n+1) brackets, n is a positive integer not less than 1; each cam set is provided with three brackets, the gravity cam simulator, the inertia cam simulator and the wind load cam simulator correspond to one bracket, respectively; and the friction disk correspondingly provided with one bracket.

In the above cam-type load simulator for aircraft cabin door, the gravity cam simulator includes a gravity cam and a gravity weight; the bracket supports the input shaft and position limits the gravity cam sleeved on the input shaft to a top of the bracket in order to conduct a motion of circumferential rotation; the gravity weight is connected to an outer circumferential side wall of the gravity cam with a steel wire rope, a corresponding torque is generated by a self-weight of the gravity weight; and the gravity cam drives the gravity weight to simulate a gravity load;

the inertia cam simulator includes an inertia cam and an inertia weight; the bracket supports the input shaft and position limits the inertia cam sleeved on the input shaft to a top of the bracket in order to conduct a motion of circumferential rotation; the inertia weight is connected to an outer circumferential side wall of the inertia cam with a steel wire rope, a corresponding torque is generated by a self-weight of the inertia weight; and the inertia cam drives the inertia weight to simulate an inertia load;

the bracket supports the input shaft and position limits the friction disk sleeved on the input shaft to a top of the bracket in order to conduct a motion of circumferential rotation; and a friction load is simulated by applying friction resistance on a disk surface of the friction disk.

In the above cam-type load simulator for aircraft cabin door, the wind load cam simulator includes a wind load cam, a wind load weight and a spring; the bracket supports the input shaft and position limits the wind load cam sleeved on the input shaft to a top of the bracket in order to conduct a motion of circumferential rotation; the wind load weight is connected to an outer circumferential side wall of the wind load cam through the spring, and a corresponding torque is generated by a self-weight of the wind load weight.

In the above cam-type load simulator for aircraft cabin door, the wind load cam simulator further includes a supporting rod; a root of the supporting rod is oriented to the input shaft, a head of the supporting rod is in contact with an inner wall of the wind load cam along a radial direction of the wind load cam, an outer protruding circumferential profile of the wind load cam is supported by the supporting rod; the supporting rod has a structure of bent rod, an outer diameter of the wind load cam is varied by bending the supporting rod; and the wind load cam drives the wind load weight to simulate a wind load.

In the above cam-type load simulator for aircraft cabin door, in case that the wind load cam circumferentially rotates until a protruding point is close to a horizontal position, the supporting rod quickly bends and retreats, the protruding point of the wind load cam is supported by the bent supporting rod; the spring and the wind load weight connected to the spring are both moved instantaneously from a supporting position of a length of the supporting rod before bending to a supporting position of a length of the supporting rod after bending; the wind load weight generates a suddenly-changed velocity to simulate a suddenly-changed disturbance wind load; a kinetic energy E generated by releasing the wind load weight is $$E = \frac{1}{2}mv^2,$$

m is a mass of the wind load weight, v is a linear velocity of the wind load weight; an additional force F generated on the load simulator is F=E/s, and s is a displacement of the wind load weight.

In the above cam-type load simulator for aircraft cabin door, an axial length of the supporting rod before bending is set to L, and a remaining axial length of the supporting rod after bending is ⅓ L.

In the above cam-type load simulator for aircraft cabin door, the gravity cam and the inertia cam have a same cam structure with a fixed and unchanged outer profile; a minimum radius R1 of the cam is arranged horizontally with the center of the input shaft as the center, an included angle between a horizontal line and the minimum radius R1 is 0°; a radius is set at every 30° counterclockwise rotation so as to obtain a radius R2 to a radius R12 of the cam; and outer ends of the radius R1 and the radius R2 are connected with smooth curve so as to obtain the outer profile of the cam structure;

a calculation formula of each radius Ri is:

$$Ri = R1 + a \cdot \sin\left(\frac{\theta}{2}\right)$$

where, i is a serial number of the radius R2 to the radius R12;

α is a parameter, and a value of a ranges from R1 to 2R1;

θ is an included angle between a straight line where the $i^{th}$ radius is located and the straight line of 0°.

In the above cam-type load simulator for aircraft cabin door, the friction disk has a circular disk-shaped structure.

In the above cam-type load simulator for aircraft cabin door, the gravity cam, the inertia cam and the wind load cam use a same adjustable cam assembly, which includes a variable cam and m actuators; each actuator is arranged along a radial direction of the variable cam with the center of the input shaft as the center; and the m actuators are uniformly and divergingly distributed inside the variable cam; outer ends of the m actuators support an outer circumferential profile of the variable cam; and m is a positive integer not less than 3.

In the above cam-type load simulator for aircraft cabin door, each actuator has a structure which is axially extendable and retractable; the outer circumferential profile of the variable cam is varied by the extension or retraction of the actuators; an axial length of the actuator in a full retracted state is set to R, and an axial length of the actuator in a full extended state is set to 2R, that is, the actuators adjust a radius of the outer circumferential profile in a range from R to 2R.

In the above cam-type load simulator for aircraft cabin door, a distance between two adjacent cams is not less than 2 times a thickness of the cam; the weights are all arranged on a same side of the cams or staggered on two sides of the cams; the input shaft drives the gravity cam, the inertia cam and the wind load cam to rotate, and an input rotation speed of the input shaft is less than 1000 r/min.

In a cam-type aircraft cabin door load simulation method based on the above cam-type load simulator for aircraft cabin door, the input shaft drives the n cam sets and the friction disk to rotate synchronously through the 3n couplings, to simulate a gravity load, an inertia load, a wind load and a friction load borne by an aircraft cabin door.

Compared with the conventional technology, the present disclosure has the following beneficial effects:

(1) according to the present disclosure, an occupied area is small. Since common area of a cabin door of an aircraft ranges from 1 m×1.5 m to 2 m×3 m, a fuselage size is large, and it can greatly reduce the occupied area of the load simulator as a loading cam diameter can reach below φ200 mm or even less;

(2) according to the present disclosure, the curve, size, number and weight of the gravity cam can be adjustable, and any continuous load curve loading can be realized through configuration, so as to simulate any loads under different cabin door masses, centroids and different four-bar linkages;

(3) according to the present disclosure, the wind load cam simulates the disturbance wind load suddenly applied by releasing the spring and the weight on the steel wire rope and can be continuously in operation.

DETAILED DESCRIPTION OF THE EMBODIMENTS

Figure 1:
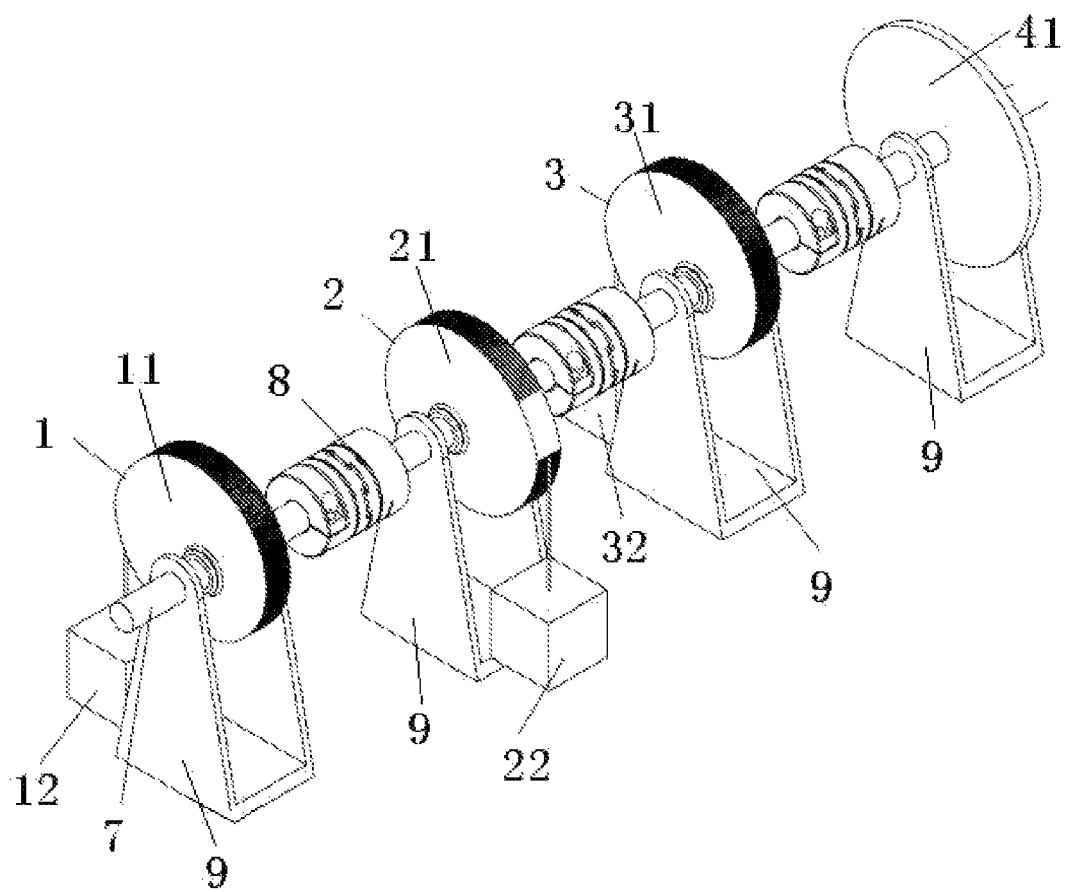
FIG. 1 is a schematic view of a load simulator of a cabin door according to the present disclosure.

The present disclosure is further illustrated below through embodiments.

A cam-type load simulator for aircraft cabin door and a simulation method therefor are provided according to the present disclosure, cam sets and a friction disk 41 are supported through a bracket 9, and a gravity cam 11, an inertia cam 21 and a wind load cam 31 are mounted on an input shaft 7. The gravity cam 11 cooperated with a gravity weight 12 is provided to simulate a gravity load; the wind load cam 31 cooperated with a wind load weight 32 is provided to simulate a wind load; the inertia cam 21 cooperated with an inertia weight 22 is provided to adjust a total inertia of a system, simulate an inertia load, and adjust a dynamic balance of a whole shafting. The present disclosure realizes the simultaneous simulation of the various loads such as the gravity load, the inertia load, the friction load, and the gust disturbance load.

A cam-type load simulator for aircraft cabin door, as shown in FIG. 1, includes n cam sets, an input shaft 7, 3n couplings 8 and a friction disk 41; the n cam sets and the friction disk 41 are connected in series through the input shaft 7; the 3n couplings 8 are arranged on the input shaft; each cam set includes a gravity cam simulator 1, an inertia cam simulator 2 and a wind load cam simulator 3; in each cam set, the gravity cam simulator 1, the inertia cam simulator 2 and the wind load cam simulator 3 are sequentially connected in series through the input shaft 7, and one coupling 8 is provided between the gravity cam simulator 1 and the inertia cam simulator 2, one coupling 8 is provided between the inertia cam simulator 2 and the wind load cam simulator, the n cam sets share 2n couplings 8; one coupling 8 is provided between any two adjacent cam sets, and (n−1) couplings 8 are provided between the cam sets; and the friction disk 41 is connected to the tail end of the n cam sets connected in series with one coupling 8. The cam-type aircraft cabin door load simulation method is specifically in that: the input shaft 7 drives the n cam sets and the friction disk 41 to rotate synchronously through the 3n couplings 8, in order to simulate a gravity load, an inertia load, a wind load and a friction load borne by an aircraft cabin door.

The load simulation device according to the present disclosure simulates a more complex working condition by connecting multiple cam sets in series. The cam sets can be arranged on one side or be staggered to meet the requirements of load simulation. A distance between any two cam sets is not less than 2 times a thickness of the cam.

The load simulator further include (3n+1) brackets 9, n is a positive integer not less than 1; each cam set is provided with three brackets 9, each of the gravity cam simulator 1, the inertia cam simulator 2 and the wind load cam simulator 3 respectively corresponds to one bracket 9; and one bracket 9 is correspondingly provided to the friction disk 41.

The gravity cam simulator 1 includes a gravity cam 11 and a gravity weight 12; the bracket 9 supports the input shaft 7 and position limits the gravity cam 11 sleeved on the input shaft 7 to a top of the bracket 9 in order to conduct a motion of circumferential rotation; the gravity weight 12 is connected to an outer circumferential side wall of the gravity cam 11 with a steel wire rope, a corresponding torque is generated by a self-weight of the gravity weight 12; and the gravity cam 11 drives the gravity weight 12 to simulate a gravity load;

The inertia cam simulator 2 includes an inertia cam 21 and an inertia weight 22; the bracket 9 supports the input shaft 7 and position limits the inertia cam 21 sleeved on the input shaft 7 to a top of the bracket 9 in order to conduct a motion of circumferential rotation; the inertia weight 22 is connected to an outer circumferential side wall of the inertia cam 21 with a steel wire rope, a corresponding torque is generated by a self-weight of the inertia weight 22; and the inertia cam 21 drives the inertia weight 22 to simulate an inertia load.

The bracket 9 supports the input shaft 7, and position limits the friction disk 41 sleeved on the input shaft 7 to a top of the bracket 9 in order to conduct a motion of circumferential rotation; and a friction load is simulated by applying friction resistance on a disk surface of the friction disk 41.

The wind load cam simulator 3 includes a wind load cam 31, a wind load weight 32 and a spring 33; the bracket 9 supports the input shaft 7 and position limits the wind load cam 31 sleeved on the input shaft 7 to a top of the bracket 9 in order to conduct a motion of circumferential rotation; the wind load weight 32 is connected to an outer circumferential side wall of the wind load cam 31 with the spring 33, and a corresponding torque is generated by a self-weight of the wind load weight 32.

A stiffness K of spring 33 refers to: K=Gd4/8d13n, G is a material shear modulus of the spring 33, d is a wire diameter of the spring 33, d1 is a pitch diameter of the spring 33, n is the number of turns of the spring 33, and the system can preset the stiffness of the spring according to the required impact load.

Figure 3:
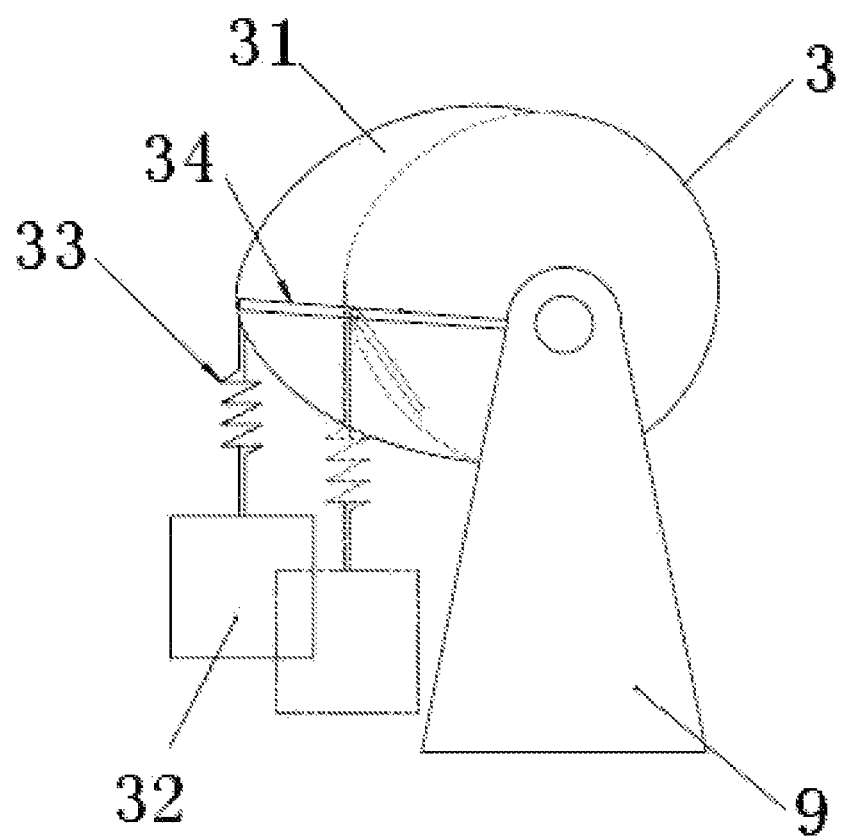
FIG. 3 is a schematic view of a wind load cam simulator according to the present disclosure.

As shown in FIG. 3, the wind load cam simulator 3 further includes a supporting rod 34; a root of the supporting rod 34 is oriented to the input shaft 7, a head of the supporting rod 34 is in contact with an inner wall of the wind load cam 31 along a radial direction of the wind load cam 31, an outer protruding circular profile of the wind load cam 31 is supported by the supporting rod 34; the supporting rod 34 has a structure of bent rod, an outer diameter of the wind load cam 31 is varied by bending the supporting rod 34; and the wind load cam 31 drives the wind load weight 32 to simulate a wind load.

In case that the wind load cam 31 circumferentially rotates until a protruding point is close to a horizontal position, the supporting rod 34 quickly bends back, the protruding point of the wind load cam 31 is supported by the bent supporting rod 34; the spring 33 and the wind load weight 32 connected to the spring 33 are both moved instantaneously from a supporting position of a length of the supporting rod 34 before bending to a supporting position of a length of the supporting rod 34 after bending; the wind load weight 32 generates an suddenly-changed velocity to simulate a suddenly-changed disturbance wind load; a kinetic energy E generated by releasing the wind load weight 32 is $$E = \frac{1}{2}mv^2,$$

wherein m is a mass of the wind load weight 32, v is a linear velocity of the wind load weight 32; an additional force F generated on the load simulator is F=E/s, and s is a displacement of the wind load weight 32. Therefore, a sudden torque may be generated on the system.

An axial length of the supporting rod 34 before bending is set to L, and a remaining axial length of the supporting rod 34 after bending is ⅓ L.

Figure 4:
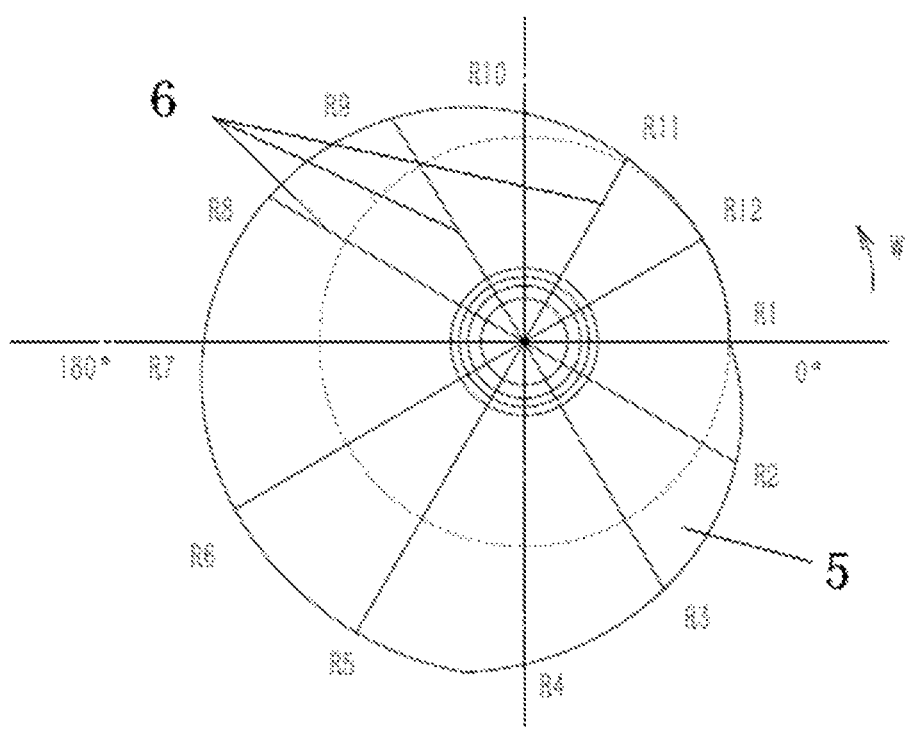
FIG. 4 is a schematic view of a cam with a fixed outer profile according to the present disclosure.

As shown in FIG. 4, the gravity cam 11 and the inertia cam 21 have a same cam structure with a fixed and unchanged outer profile. Provided that a minimum radius R1 of the cam is arranged horizontally with the center of the input shaft 7 been taken as the center, an included angle between a horizontal line and the minimum radius R1 is 0°; a new radius is set at every 30° counterclockwise rotation so as to obtain a radius R2 to a radius R12 of the cam; and the outer profile of the cam structure can be obtained by connecting outer ends of the radius R1 and the radius R2 with smooth curve.

A calculation formula of each radius Ri is:

$$Ri = R1 + a \cdot \sin\left(\frac{\theta}{2}\right)$$

Wherein, i is a serial number of the radius R2 to the radius R12;

α is a parameter, and a value of a ranges from R1 to 2R1;

θ is an included angle between a straight line where the $i^{th}$ radius is located and the straight line of 0°.

The friction disk 41 has a circular disk-shaped.

An ordinary cam or an adjustable cam can be applied to the gravity cam 11 and the inertia cam 21, and the adjustable cam can realize different motion curves by adjusting a cam profile in real time through multiple actuators 6, so as to simulate the loads under different working conditions.

The gravity cam 11, the inertia cam 21 and the wind load cam 31 use a same adjustable cam assembly, which includes a variable cam 5 and m actuators 6; each actuator 6 is arranged along a radial direction of the variable cam 5 with the center of the input shaft 7 as the center; and the m actuators 6 are uniformly and divergingly inside the variable cam 5; outer ends of the m actuators 6 support an outer circumferential profile of the variable cam 5; and m is a positive integer not less than 3.

Each actuator 6 has a structure which is axially extendable and retractable; the outer circumferential profile of the variable cam 5 is varied by the extension or retraction of the actuators 6; an axial length of the actuator 6 in a full retracted state is set to R, and an axial length of the actuator 6 in a full extended state is set to 2R, that is, the actuators 6 adjust a radius of the outer circumferential profile in a range from R to 2R.

Figure 2:
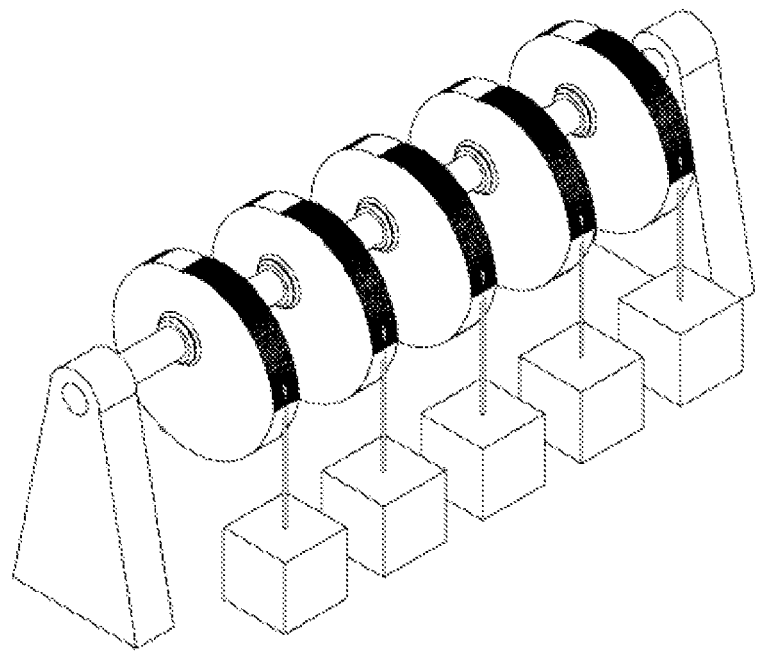
FIG. 2 is a schematic view of a same column distribution according to the present disclosure.

A distance between any two adjacent cams is not less than 2 times a thickness of the cam; the weights are all arranged on the same side of the cams (as shown in FIG. 2) or are arranged staggered on two sides of the cams (as shown in FIG. 1). The input shaft 7 drives the gravity cam 11, the inertia cam 21 and the wind load cam 31 to rotate, and an input rotation speed of the input shaft 7 is less than 1000 r/min.

The actuator 6 can be of many types, such as hydraulic cylinder and piston rod or motor and lead screw, the actuator 6 includes an actuator base and an actuator pushing rod, and the pushing rod is telescopic for adjustment, so as to adjust the outer profile curve of the cam.

Figure 5:
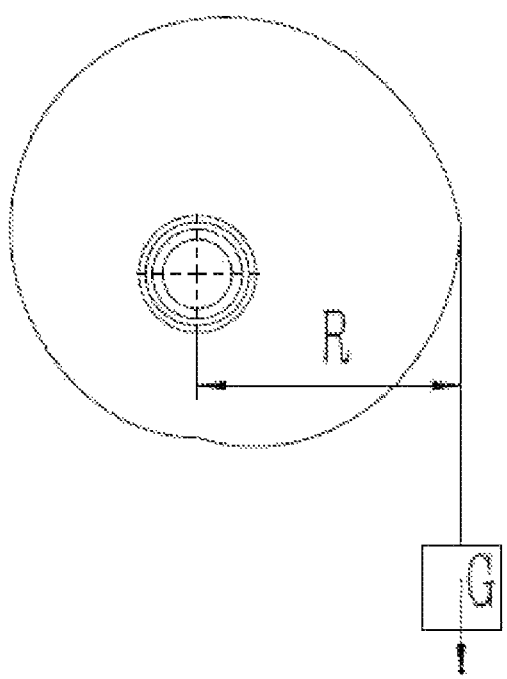
FIG. 5 is a schematic view showing a force situation of the cam during operation according to the present disclosure.

FIG. 5 shows a force condition of the cam during operation, $T=R(\theta) \times G(x)$, wherein T is a torque load generated by the cam, $R(\theta)$ is a distance from a center of the cam to a side, $G(x)$ is a gravity of the weight; $G(x)=a+bx$, a is a self-weight of the steel wire rope and a weight frame, b is a mass of an added single weight, x is the number of weights, and $x \geq 0$. A moment inertia of the inertia cam is $J=\Sigma m_i r_i^2$, wherein mi is a mass of the cam, ri is a distance from the center of mass to the center of the rotation shaft, the inertia cam can adjust a response speed of the system by changing the outer profile to generation different inertia moments.

Figure 6:
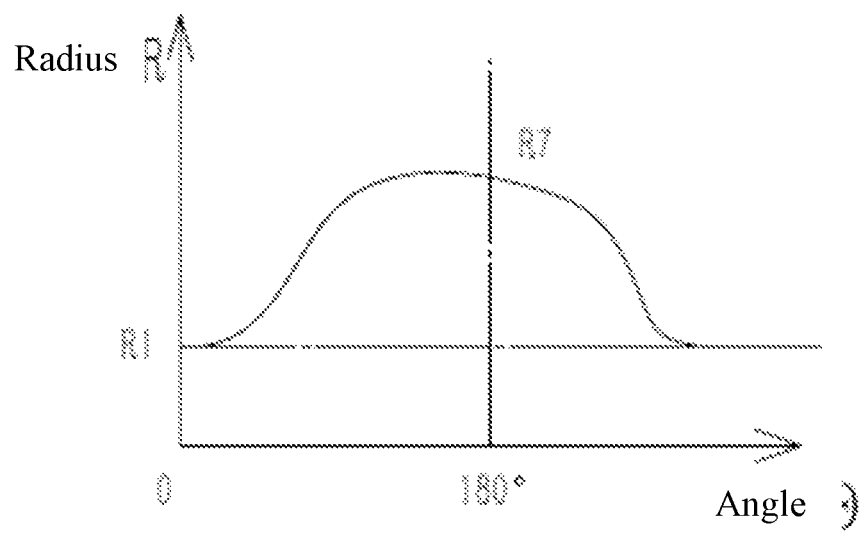
FIG. 6 is a curve showing a relation between a radius and an angle of the cam according to the present disclosure.

FIG. 6 is a curve showing a relation between a force radius and an angle provided by the cam. The cam rotates counterclockwise by different angles, and a distance from the weight on an edge of the cam to the axis center is varied accordingly, so that the moment arm $R(\theta)$ with different lengths is generated, different moments T corresponding to the mass $G(x)$ of the weight are generated, so as to simulate the load under all working conditions.

The n cam sets are connected in series through the couplings 8, and the loading systems with different numbers can be selected according to different working conditions, so as to realize simulation under full working conditions.

Although the present disclosure has been disclosed as above in preferred embodiments, it is not intended to define the present disclosure. Any person skilled in the art can make possible changes and modifications to the technical solution of the present disclosure by using the above disclosed methods and technical contents without departing from the spirit and scope of the present disclosure. Therefore, any simple modification, equivalent change and modification to the above embodiments according to the technical essence of the present disclosure belongs to the protection scope of the technical solution of the present disclosure.

The invention claimed is:

1. A cam-type load simulator for aircraft cabin door, comprising: n cam sets, an input shaft, 3n couplings and a friction disk; the n cam sets and the friction disk are connected in series through the input shaft; the 3n couplings are arranged in the input shaft; wherein each cam set comprises a gravity cam simulator, an inertia cam simulator and a wind load cam simulator; in each cam set, the gravity cam simulator, the inertia cam simulator and the wind load cam simulator are sequentially connected in series through the input shaft, and one coupling is provided between the gravity cam simulator and the inertia cam simulator, one coupling is provided between the inertia cam simulator and the wind load cam simulator, the n cam sets share 2n couplings; one coupling is provided between any two adjacent cam sets, and couplings are provided between the cam sets; wherein the friction disk is connected to the tail ends of the n cam sets connected in series through one coupling.

2. The cam-type load simulator for aircraft cabin door according to claim 1, wherein the load simulator further comprises 3n+1 brackets, n is a positive integer not less than 1; each cam set is provided with three brackets, the gravity cam simulator, the inertia cam simulator and the wind load cam simulator correspond to one bracket, respectively; and the friction disk is correspondingly provided with one bracket.

3. The cam-type load simulator for aircraft cabin door according to claim 2, wherein the gravity cam simulator comprises a gravity cam and a gravity weight; wherein the bracket supports the input shaft and position limits the gravity cam sleeved on the input shaft to a top of the bracket in order to conduct a motion of circumferential rotation; the gravity weight is connected to an outer circumferential side wall of the gravity cam with a steel wire rope, a corresponding torque is generated by a self-weight of the gravity weight; and the gravity cam drives the gravity weight to simulate a gravity load;

wherein the inertia cam simulator comprises an inertia cam and an inertia weight; wherein the bracket support the input shaft and position limits the inertia cam sleeved on the input shaft to a top of the bracket in order to conduct a motion of circumferential rotation; the inertia weight is connected to an outer circumferential side wall of the inertia cam with a steel wire rope, a corresponding torque is generated by a self-weight of the inertia weight; and the inertia cam drives the inertia weight to simulate an inertia load; and wherein the bracket supports the input shaft and position limits the friction disk sleeved on the input shaft to a top of the bracket in order to conduct a motion of circumferential rotation; and a friction load is simulated by applying friction resistance on a disk surface of the friction disk.

4. The cam-type load simulator for aircraft cabin door according to claim 3, wherein the wind load cam simulator comprises a wind load cam, a wind load weight and a spring; wherein the bracket supports the input shaft and position limits the wind load cam sleeved on the input shaft to a top of the bracket in order to conduct a motion of circumferential rotation; the wind load weight is connected to an outer circumferential side wall of the wind load cam through the spring, and a corresponding torque is generated by a self-weight of the wind load weight.

5. The cam-type load simulator for aircraft cabin door according to claim 4, wherein the wind load cam simulator further comprises a supporting rod; a root of the supporting rod is oriented to the input shaft, a head of the supporting rod is in contact with an inner wall of the wind load cam along a radial direction of the wind load cam, an outer protruding circumferential profile of the wind load cam is supported by the supporting rod; the supporting rod has a structure of bent rod, an outer diameter of the wind load cam is varied by bending the supporting rod; and the wind load cam drives the wind load weight to simulate a wind load.

6. The cam-type load simulator for aircraft cabin door according to claim 5, wherein in case that the wind load cam circumferentially rotates until a protruding point is close to a horizontal position, the supporting rod quickly bends and retreats, and the protruding point of the wind load cam is supported by the bent supporting rod; the spring and the wind load weight connected to the spring are both moved instantaneously from a supporting position of a length of the supporting rod before bending to a supporting position of a length of the supporting rod after bending; the wind load weight generates a suddenly-changed velocity to simulate a suddenly-changed disturbance wind load; a kinetic energy E generated by releasing the wind load weight is $$E = \frac{1}{2}mv^2,$$

wherein m is a mass of the wind load weight, v is a linear velocity of the wind load weight; an additional force F generated on the load simulator is F=E/s, and s is a displacement of the wind load weight.

7. The cam-type load simulator for aircraft cabin door according to claim 6, wherein an axial length of the supporting rod before bending is set to L, and a remaining axial length of the supporting rod after bending is ⅓ L.

8. The cam-type load simulator for aircraft cabin door according to claim 7, wherein the gravity cam and the inertia cam have a same cam structure with a fixed and unchanged outer profile; a minimum radius R1 of the cam is arranged horizontally with the center of the input shaft as the center, an included angle between a horizontal line and the minimum radius R1 is 0°; a new radius is set at every 30° counterclockwise rotation so as to sequentially obtain a radius R2 to a radius R12 of the cam; and outer ends of the radius R1 and the radius R2 are connected with smooth curve so as to obtain the outer profile of the cam structure; a calculation formula of each radius Ri is in that:

$$Ri = R1 + a \cdot \sin\left(\frac{\theta}{2}\right)$$

wherein, i is a serial number of the radius R2 to the radius R12;
a is a parameter, and a value of a ranges from R1 to 2R1;
θ is an included angle between a straight line where the $i^{th}$ radius is located and the straight line of 0°.

9. The cam-type load simulator for aircraft cabin door according to claim 8, wherein the friction disk has a circular disk-shaped structure.

10. The cam-type load simulator for aircraft cabin door according to claim 4, wherein the gravity cam, the inertia cam and the wind load cam use a same adjustable cam assembly, which includes a variable cam and m actuators; each actuator is arranged along a radial direction of the variable cam with the center of the input shaft as the center; and the m actuators are uniformly and divergingly distributed inside the variable cam; outer ends of the m actuators support an outer circumferential profile of the variable cam; and m is a positive integer not less than 3.

11. The cam-type load simulator for aircraft cabin door according to claim 10, wherein each actuator has a structure which is axially extendable and retractable; the outer circumferential profile of the variable cam is varied by the extension or retraction of the actuators; wherein an axial length of the actuator in a full retracted state is set to R, and an axial length of the actuator in a full extended state is set to 2R, and the actuators adjust a radius of the outer circumferential profile in a range from R to 2R.

12. The cam-type load simulator for aircraft cabin door according to claim 11, wherein a distance between two adjacent cams is not less than 2 times a thickness of the cam; the weights are all arranged on the same side of the cams or staggered on two sides of the cams; the input shaft drives the gravity cam, the inertia cam and the wind load cam to rotate, and an input rotation speed of the input shaft is less than 1000 r/min.

13. A cam-type load simulation method for aircraft cabin door based on the cam-type load simulator for aircraft cabin door according to claim 1, wherein the input shaft drives the n cam sets and the friction disk to rotate synchronously through the 3n couplings, to simulate a gravity load, an inertia load, a wind load and a friction load borne by an aircraft cabin door.

* * * * *